Patented Apr. 30, 1946

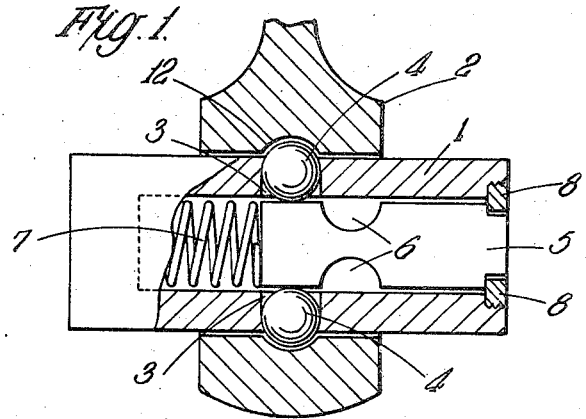
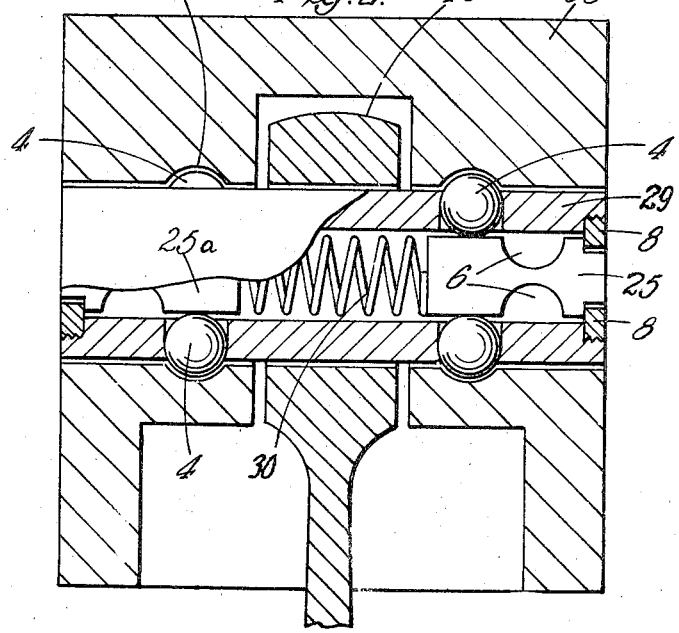
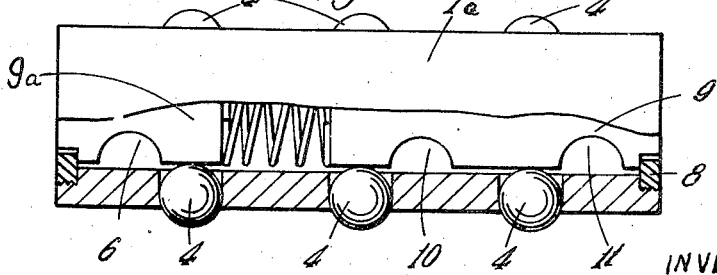

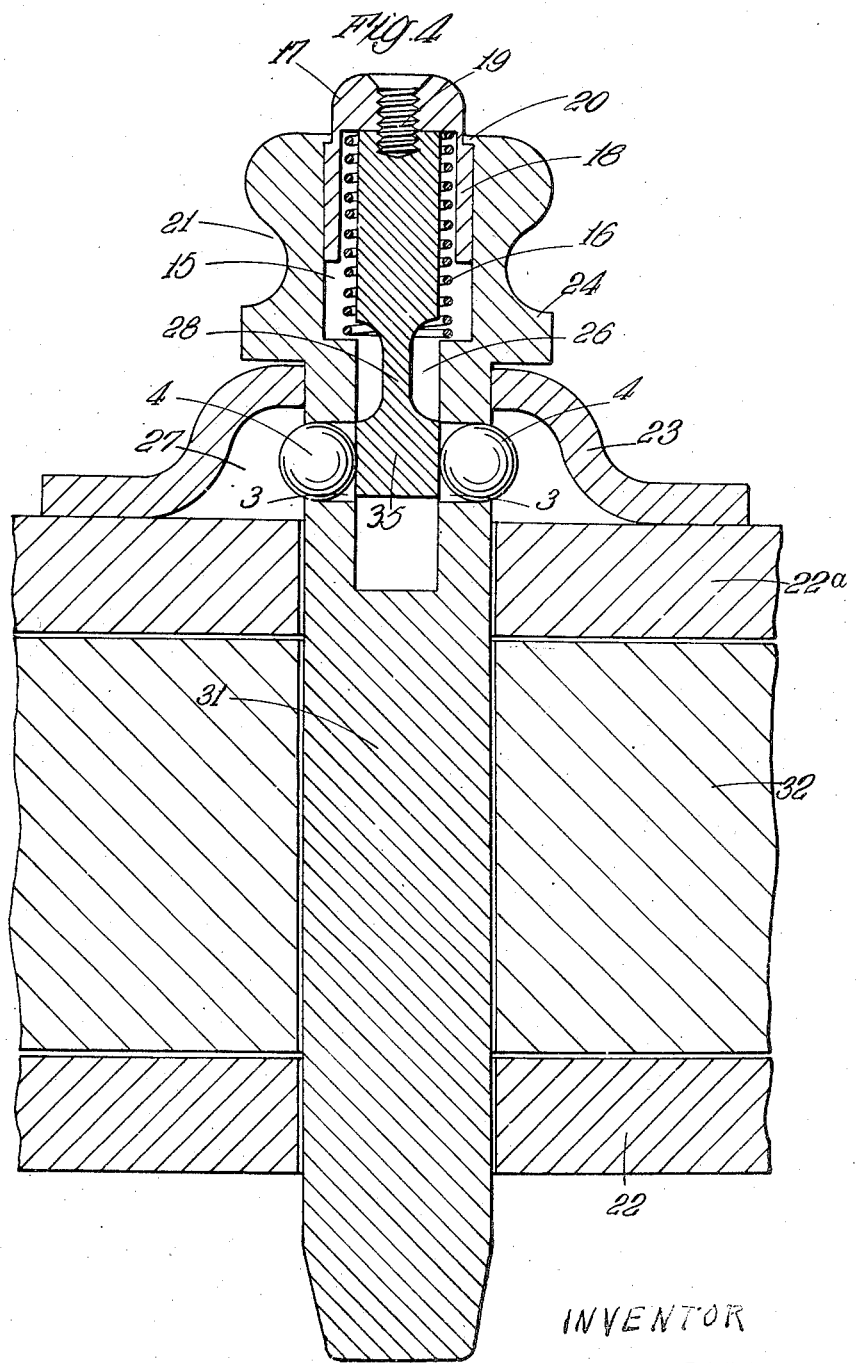

2,399,581

UNITED STATES PATENT OFFICE 2,399,581

LOCKING OR COUPLING PIN, SHORT SHAFT, AND SIMILAR DEVICES

Reginald Arthur William Spooner, Walton-on-Thames, England, assignor to Woodfield Engineering Limited, London, England Application January 5, 1943, Serial No. 471,376
In Great Britain January 28, 1942

6 Claims. (Cl. 287—96)

This invention relates to coupling pins or shafts, such for example, as gudgeon pins used in pistons and pins used for coupling vehicles together.

One object of the invention is to provide an improved means of locating and retaining a pin or shaft in position axially.

Another object of the invention is to lock a pin firmly in position while allowing it to be quickly released when desired.

A further object of the invention is to provide a gudgeon pin which can be held axially in both a piston and a connecting rod but can easily be inserted and released.

In my present invention I make use of a principle of operation embodied in the device described in my British Patent No. 524,297, that is to say, I employ a tubular member containing one or more balls or the equivalent mounted to move in a radial bore or bores, and these balls are caused to project out from the tubular member to form abutments by the action of a spring-loaded member that is axially movable in the tubular member and that, on being moved against the spring, allows the balls to move inwards and cease to act an abutments.

The manner in which the objects of the present invention are attained will best be understood from the following description of some embodiments of it when taken in conjunction with the annexed drawings, in which:

Fig. 1 is an elevation, partly in section, of one coupling pin;

Fig. 2 is a similar view of a gudgeon pin in a piston;

Fig. 3 is a similar view of another gudgeon pin adapted to be used in a piston; and Fig. 4 is a vertical section through a vehicle coupling pin.

The simplest form of pin is shown in Fig. 1. It shows a pin 1 passing through the eye of a strap 2. The pin is tubular and externally cylindrical and at its middle it is formed with two radial bores 3 in each of which there is a ball 4 which is prevented from escaping because the mouth of the bore 3 is spun over. The strap 2 is formed with an internal groove 12 into which the balls 4 project so that by the engagement of the balls and groove the pin is accurately located axially. The balls are forced outwards into engagement with the groove by a member 5 which is mounted to move axially in the bore of the pin 1 against the action of a spring 7 and which is formed with a waist or groove 6 so that it presents a groove into which the balls 4 can sink when it is pushed inwards against the spring 7. To prevent the member 5 from being pushed out of the pin by the spring its outer end is reduced in diameter to leave a shoulder which engages a ring 8 let into the end of the bore of the pin and forming a retaining flange.

To insert the pin in the strap all that is necessary is to push the member 5 inwards against spring 7 and then insert the pin in the strap and allow the member to move back, whereupon the balls 4 are forced radially outwards into the groove.

In this simple form of construction the balls 4 may be replaced by any equivalent elements; the number of radial bores and grooves may be varied, since in some instances one may be enough and in others more than two bores and balls may be desirable; the member 5 may be retained within the pin by any suitable means other than the retaining ring 8; the groove 6 may be replaced by any other suitable form of recess or recesses; and if it is not necessary for the axially movable member to lie wholly within the pin, it may have an operating knob or ring and be operated by a pull instead of by a pushing action as in the example shown.

Fig. 2 shows a gudgeon pin in position in a piston 33. The pin (shown at 29) closely resembles the pin of Fig. 1 but in this instance there are two sets of radial bores, one set near each end of the pin, and each set cooperates with a groove 13 formed in the wall of the piston 33 through which the gudgeon pin extends. In this case there are two axially movable members 25 and 25a and a single spring 30 is arranged between them. To insert or release the pin it is necessary to move both the members 25 and 25a inwards, the spring being compressed between them, and then both the sets of balls will sink inwards into the waist or grooves 6. The figure shows the strap 14 of a connecting rod held in position by the pin.

If desired, in a construction such as that shown in Fig. 2, the connecting rod may itself be axially located relatively to the pin by providing three sets of balls and forming an internal groove on the connecting rod, that is to say in effect combining the constructions of Figs. 1 and 2. The resultant pin 1a is shown in Fig. 3. It will be observed that there are two axially movable members, the left-hand one of which, 9a, cooperates with the left-hand set of balls 4, and the right-hand one of which, 9, cooperates with both the other sets of balls and is accordingly provided with two grooves 10 and 11.

It will be understood that the modifications described above in connection with Fig. 1 may be applied in principle to the other constructions. Moreover in the constructions shown in Figs. 2 and 3 there may be only one axially movable member.

In the construction shown in Fig. 4, the pin consists of a long plain shank 31 with a head 24, and is shown in position in a towing attachment for a vehicle. The shank enters openings in the arms 22a and 22 of the forked end of one of the elements to be coupled and an eye in the other member 32 which lies between the two forked arms. A dome-shaped member 23 is welded to the upper surface of the arm 22a so as to form above that surface a cavity 27 into which two balls 4 project to lock the pin in position. These balls 4 can move in radial bores 3 in the pin but are restrained from escaping outwards completely because the mouths of the bores 3 are spun over. As before, the balls 4 are forced to project outwards by a member 35 which can move axially in a bore 26 in the head of the pin and which is formed with a waist 28. The upper part of the member 35 is surrounded by a spring 16 within an enlarged part 15 of the bore 26 and is secured by a screw 19 to a cap 17 having a skirt 18 formed with a shoulder which engages under an internal flange 20 at the mouth of the part 15 of the bore 26. When axial pressure is applied to the cap 17 the member 35 moves downwards to bring the waisted part 28 opposite the balls 4 so that the latter can sink inwards in the radial bores 3. When they do this, the pin can easily be inserted and withdrawn and when the cap 17 is released again the spring 16 will restore the member 35 to its normal position, thus once more forcing the balls 4 outwards.

To facilitate operation a groove 21 is made around the head of the pin so that the operator's fingers can engage in this while his thumb bears on the cap 17.

It will be seen that the arm 22a and dome-shaped member 23 together constitute an element with an internally recessed cylindrical opening that is entered by the coupling pin.

It will also be seen that the whole of the retaining mechanism is accommodated in the head of the pin and that the shank may be of any desired length and is not weakened by an internal bore. The application of the dome-shaped member or its equivalent to the surface of the coupled element is a very simple matter.

What I claim is:

1. In combination, an element formed with an internally recessed tubular opening, a cylindrical tubular coupling member projecting through said opening with its ends extending on each side thereof and a second element formed with two internally recessed openings spaced apart and each receiving one of the ends of said coupling member, said coupling member having three sets of axial abutments, each set comprising at least one member mounted to move radially while being restrained from escaping from said coupling member and to project from the surface of said coupling member into an internal recess in one of said openings, whereby to locate and hold said coupling member axially in each of said openings, operating means movable axially in said coupling member and shaped to force said radially movable members outwards but to allow said radially movable members to move inwardly out of engagement with the respective recesses upon axial movement of said operating means, and spring means for holding said operating means in position to force said radially movable members outwards.

2. In combination, an element formed with an internally recessed tubular opening, a cylindrical tubular coupling member projecting through said opening with its ends extending on each side thereof and a second element formed with two internally recessed openings spaced apart and each receiving one of the ends of said coupling member, said coupling member having three sets of axial abutments, each set comprising at least one member mounted to move radially while being restrained from escaping from said coupling member and to project from the surface of said coupling member into an internal recess in one of said openings whereby to locate and hold said coupling member axially in each of said openings, two operating members movable in an axial bore in said coupling member, one of said operating members being shaped to force one of said sets of axial abutments outwards but to allow said set to move inwardly out of engagement with the respective recess upon axial movement of said operating member and the other of said operating members being shaped to be similarly operative upon the other two sets of said axial abutments, and a coil spring located in said axial bore and urging each of said operating members into position to force the respective axial abutment or abutments outwards.

3. A coupling pin comprising a tubular member of uniform external diameter with at least one radial bore at its midpoint, a member mounted to move radially in but restrained from escaping from each radial bore, a member axially movable in said tubular member and operative in its normal position to force said radially movable member to project from the surface of said tubular member but shaped to allow said radially movable member to sink into said tubular member upon axial movement from the normal position, and spring means for holding said axially movable member in its normal position.

4. A coupling pin comprising a tubular member of uniform external diameter with at least one radial bore adjacent each end, a member mounted to move radially in but restrained from escaping from each radial bore, two members axially movable in said tubular member, and a coil spring separating and acting on each of said axially movable members, each of said axially movable members being operative in its normal position to force one radially movable member to project from the surface of said tubular member but shaped to allow said radially movable member to sink into said tubular member upon movement from the normal position against the action of said spring.

5. A coupling pin comprising a tubular member of uniform external diameter with at least one radial bore at each of three points along its length, three sets of projecting members carried by said tubular member, each set consisting of at least one member mounted to move in but restrained from escaping from a radial bore in the tubular member, two members axially movable in said tubular member and a coil spring separating and acting on each of said axially movable members, the one axially movable member being operative in its normal position to force one set of radially movable members to project from the surface of said tubular member but shaped to allow them to sink into the tubular member upon movement from the normal position against said spring, and the other axially movable member being similarly operative on the other two sets of radially movable members.

6. In combination, an element formed with a bore extending therethrough, said bore having two spaced apart internal recesses and a tubular coupling member located in said bore, said coupling member having adjacent each of its ends a locking member mounted to move radially while being restrained from escaping outwardly from said coupling member and to project from the surface of said coupling member into one of said recesses in said bore of said element, whereby to locate and hold said coupling member axially with respect to said element, operating means comprising a plunger movable axially in said tubular coupling member, portions of said plunger fitting snugly in said tubular coupling member to force said locking members outwards and having recesses for receiving said locking members to allow them to move inwardly out of engagement with the respective recesses in the bore of the said element upon axial movement of said operating means, and spring means for holding said operating means in position to force said locking members outward.

REGINALD ARTHUR WILLIAM SPOONER.